United States Patent [19]
Bos et al.

[11] Patent Number: 5,248,277
[45] Date of Patent: Sep. 28, 1993

[54] METHOD AND DEVICE FOR PROCESSING THE SKIN OF A LEG OF A SLAUGHTERED BIRD

[75] Inventors: Jan W. Bos, Ede; Adrianus J. van den Nieuwelaar, Gemert, both of Netherlands

[73] Assignee: Stork PMT B.V., Boxmeer, Netherlands

[21] Appl. No.: 899,736

[22] Filed: Jun. 17, 1992

[30] Foreign Application Priority Data

Jun. 18, 1991 [NL] Netherlands ............... 9101050

[51] Int. Cl.⁵ ............................. A22C 21/00
[52] U.S. Cl. ............................. 452/125; 452/127; 452/130; 452/136; 452/166
[58] Field of Search ............... 452/125, 127, 130, 136, 452/166, 167

[56] References Cited

U.S. PATENT DOCUMENTS

| | | |
|---|---|---|
| 3,930,283 | 1/1976 | Martin . |
| 4,102,015 | 7/1978 | Herrick . |
| 4,184,230 | 1/1980 | Fox et al. . |
| 4,480,353 | 11/1984 | Martin et al. . |
| 4,610,051 | 9/1986 | Martin et al. . |
| 4,697,307 | 10/1987 | Martin et al. ............... 452/130 |
| 4,723,339 | 2/1988 | van de Nieuwelaar et al. ... 452/130 |
| 5,173,077 | 12/1992 | van de Nieuwelaar et al. ... 452/135 |
| 5,176,563 | 1/1993 | van de Nieuwelarr et al. ... 452/166 |

FOREIGN PATENT DOCUMENTS

0442554 8/1991 European Pat. Off. .
1181462 2/1970 United Kingdom .

*Primary Examiner*—Willis Little
*Attorney, Agent, or Firm*—Deveau, Colton & Marquis

[57] ABSTRACT

Method and device for processing the skin of a leg of a slaughtered bird. The bird or leg is moved along in a conveyor. The skin of the leg is cut through completely or almost completely in the vicinity of the knee joint between the region of the kneecap and the region of the back of the knee, the tissue lying under the skin remaining essentially intact, by conveying the leg past a cutting device and putting it in contact therewith. The leg is supported by leg positioning elements while it is passing the cutting device. The cutting depth of the cutting means is limited by a stop which is connected to the cutting means. Provision is made for a stripping device for stripping the severed thigh skin away from the suspended leg downwards. Provision is also made for a roll-up device for rolling up the drumstick skin prior to separating the leg into a thigh portion and a drumstick.

22 Claims, 6 Drawing Sheets

METHOD AND DEVICE FOR PROCESSING THE SKIN OF A LEG OF A SLAUGHTERED BIRD

BACKGROUND OF THE INVENTION

This invention relates to a method and device for processing the skin of a leg of a slaughtered bird, which method and device are intended for use in a mechanized slaughterhouse, where bird carcasses or separate legs are moved along a predetermined path in a conveyor. Bird carcasses can be hanging by the tarsal joints of the legs from a conveyor hook or similar conveying element, or they may be fixed to support members projecting into the body cavity of the carcasses. Separate legs may also be hanging by the tarsal joint from a conveying element, or they may be fixed to a support member.

DISCUSSION OF THE PRIOR ART

In the mechanized slaughter of poultry the carcass is divided in a so-called "portions line" into a number of different products such as breast and legs, which are wanted separately by the consumer, and thereby as a sum of the parts give a considerably higher profit than a whole, unportioned bird.

The leg of a bird, with the toes removed, is sold either whole or further divided into thigh and drumstick. In the former case the leg is generally sold without undergoing further processing, although it is also possible for the thigh skin to be removed before the leg is offered for sale. In the latter case the leg according to the prior art is cut through near its knee joint, and the thigh which comes away is then skinned or left as it is, and may be boned, before the drumstick thus obtained is offered for sale. It is also known to cut into the tissue of the leg near its knee joint up to the knee joint, to strip the thigh meat from the thigh bone, to remove the skin from the thigh meat, and finally to separate the thigh bone from the drumstick, so that again thigh and drumstick are available separately.

In a mechanized slaughterhouse, where the legs of birds are normally conveyed from one processing station to the next hanging by the tarsal joint in a conveyor, the removal of the skin from the thigh meat, either as the sole processing operation, or as a processing operation following the removal of the thigh meat and possibly the thigh bone from the leg, cannot be carried out without human intervention. If only the skin is being removed from the thigh, the processing operation involves making a cut by hand through the skin and pulling away or further cutting away the thigh skin from the leg. The legs are collected for this beforehand. If the removal of the skin from the thigh is accompanied by separation of the leg into a thigh portion and a drumstick, with the thigh portions being collected first, the skin is pulled away or cut away by hand, or the thigh portion is fed in by hand to a processing machine for mechanical removal of the skin from the thigh portion. The necessary human intervention is expensive, lowers the bacteriological quality of the end products, and produces the risk of cross-contamination.

After the cutting through of a leg or cutting into the tissue of the leg near its knee joint, the drumstick is not completely covered with skin near the knee joint. This is the result of the tensile stress normally present in the skin, which causes the cut edge of the skin to recede past the cut edge of the underlying tissue, which becomes partially exposed as a result. A first drawback here is that this makes the appearance of the drumstick less attractive, as a result of which it is not as easy to sell. A second drawback is that the exposure of the tissue lying under the skin leads to a greater risk of bacteriological contamination of said tissue, which has an adverse effect on the shelf life and saleability of the drumstick.

SUMMARY OF THE INVENTION

The object of the invention is in the first place to provide a method which eliminates the human intervention in processing the leg and leads to the production of a drumstick with a more attractive appearance and a longer shelf life.

These objects are attained according to the invention by cutting the skin of the leg through completely or almost completely in the vicinity of the knee joint along a side of the leg between the region of the kneecap and the region of the back of the knee, the tissue lying under the skin remaining essentially intact, by conveying the leg in a position determined by leg positioning means interacting with the conveyor past cutting means and placing it in contact therewith, the cutting depth of the cutting means being limited by a stop resting on the skin near the skin cut and being connected to the cutting means. In the method according to the invention the skin of the leg can be cut through along a predetermined path in the vicinity of the knee joint without any human intervention. This path can be determined as desired within certain limits by setting the cutting means in conjunction with the action of the leg positioning means, which leg positioning means guide and support the leg. The leg positioning means can support the leg, for example, at the sides, although a support at the tarsal joint or the hip joint is also possible. It is thus, for example possible to cut in or through the skin of the leg while the leg is still in one piece and hangs in the conveyor, that is ready and in position for further mechanical processing operations. Another possibility is to cut in or through the skin of the legs when the legs still form part of a carcass portion comprising a body part, for example a back half of a bird hanging by the legs in a conveyor, or a complete body part fixed to a support element.

Although a skin cut at one side of the leg is sufficient for most further processing operations, the best results are obtained if the skin of the leg is cut through completely or almost completely both at the inside and at the outside thereof.

In view of a leg being suspended by its tarsal joint in the conveyor, the position of the center of gravity of the leg, and the generally desired path of the skin cut, the front side of the leg is preferably directed in the direction of conveyance or in the opposite direction, and the leg positioning means hold the leg tilted in the direction of its front side while passing the cutting means.

Mechanically cutting through the skin of the leg in a controlled way while the leg is being moved along in a conveyor opens up a whole range of new and advantageous processing possibilities. One of these possibilities is that the at least partially cut away thigh skin is stripped downwards from the leg when the leg is hanging from its tarsal joint from a conveyor element. This stripping, which can be carried out mechanically, produces a leg skinned from the vicinity of the knee joint up to the hip joint which can be sold as it is, or can subsequently be separated into a thigh portion without skin and a drumstick with skin. If the thigh skin is not stripped off after the skin cut is made, the leg can be divided into a thigh portion with skin and a drumstick with skin.

In particular in the latter case, but also in the case of a leg with the thigh skin already removed, the edge of the skin of the drumstick above the skin cut which has been made is rolled up prior to the separation of the drumstick from the thigh portion in order to carry out the separating operation above the position of the skin cut on the leg and below the edge of the rolled-up skin of the drumstick. The result is that, after separation of the leg into a thigh and a drumstick, the drumstick skin at least partially covers the underlying tissue of the drumstick up to the point of separation and, if desired, projects slightly beyond the point of separation and covers it. Cutting into the drumstick skin during cutting off of the thigh, or during scraping of the thigh meat off the thigh bone, is prevented. After carrying out of the last-described method, the drumstick looks more attractive, and therefore is easier to sell. With this measure, it is also possible to maintain a high bacteriological quality of the meat for a longer period of time. The measure also produces the economic advantage that the cut-off drumstick has more skin, is thus higher in weight, and therefore represents a higher money value on sale.

The above terms "the region of the kneecap" and "the region of the back of the knee" must be understood to mean that the skin cut is always made in the vicinity of the knee joint along a predetermined path which is essentially determined by the processing operations which may follow, and runs along at least one side of the leg.

The method according to the invention is embodied in a device, comprising a conveyor for moving a leg connected to a conveyor element along a predetermined path, which device comprises: leg positioning means interacting with the conveyor, which leg positioning means can move along with the leg and support it; cutting means fitted in the area of the path of the leg for completely or almost completely cutting through the skin of the leg in the vicinity of the knee joint along a side of the leg between the region of the kneecap and the region of the back of the knee; and cutting depth limiting means for limiting the cutting depth of the cutting means with a stop resting on the skin near the skin cut and being connected to the cutting means. The way in which the leg positioning means and the device as a whole operate has already been explained above.

In a preferred embodiment the cutting means comprise a rotary driven cutter with an essentially circular cutting edge, which cutter is provided near the cutting edge with a stop face for limiting the cutting depth, and is biassed in the direction of the leg. The biassing force operating on the cutter, which can be supplied by, for example, a spring, ensures that the cutting action of the cutter begins at the front side of the leg, and that the cutter also follows the contour of the skin as well as possible at one side of the leg, which contour is determined by the underlying tissue. Any forces exerted here on the leg at right angles to the direction of conveyance can be absorbed at the other side of the leg by a guide. This guide can be, for example, a bar or plate running parallel to the conveyor. The forces exerted on the leg during cutting through of the skin are absorbed by the leg positioning means. If two cutting means are used, the transverse force exerted on the leg by the first cutting means can be compensated for by the transverse force in the opposite direction caused by the second cutting means.

The cutter can be, for example, a circular shape, but in a preferred embodiment the cutting edge of the cutter is formed by a number of cutters fitted along the periphery of a support, which are adjustable in the radial direction and have a cutting edge running essentially in the peripheral direction. After sharpening of the cutters the required cutting depth is then simple to set.

The cutter can preferably be driven in such a direction of rotation that the cutting edge thereof at the side facing the leg moves in the direction of conveyance of the leg. This prevents the cutter during its rotation from pressing the leg out laterally as a result of the forces exerted by the cutting edge on the leg through the skin.

If the leg is hanging by the tarsal joint from a conveyor element, it is advantageous if the leg positioning means comprise a number of positioning elements which are movable in a path which at least at the position of the working region of the cutting means coincides with that of a leg and has the same direction. The positioning elements in principle need operate only during the cutting through of the skin to be carried out with the cutting means, and such a provision can consequently be very limited and simple.

If the movement of the positioning elements is controllable relative to the movement of the conveyor elements, the path of the cut in or through the skin of the leg can be predetermined and geared to the average or current leg measurements, since a difference in position (viewed in the direction of conveyance) and/or speed between a conveyor element and an accompanying positioning element affects the position of the leg hanging from and move along by the conveyor element. A suitable cutting of the skin, adapted to the next processing operation to be carried out on the leg, namely cutting off the thigh portion, can thus be carried out in all circumstances.

In a preferred embodiment the leg positioning means are designed in such a way that each positioning element is fitted on one end of an arm, which at the other end is provided with a follower wheel and between the two ends is pivotably mounted on a support which is driven so that it rotates about a shaft, the follower wheel being guided in a closed curved track running at right angles to the shaft, for controlling the path of the positioning element. The control of the curved track means that the speed and the momentary position of the position elements can be selected arbitrarily within the limits of the design.

The positioning elements can consist of freely rotatable, centrally supported discs, which means that they can exert forces directed away from the central point in all directions on the rear side (viewed in the direction of conveyance) of a leg.

It is advantageous to provide the device according to the invention, each leg hanging by the tarsal joint from a conveyor element, with thigh skin stripping means for stripping downwards the at least partially cut away thigh skin. In particular, the thigh skin stripping means comprise a pair of helical rollers disposed below the conveyor parallel to the direction of conveyance in the path of the thigh portion of the leg, which rollers are driven so that they rotate in opposite directions with respect to each other.

A preferred embodiment of the device, which is specially designed for separating legs into a thigh portion and a drumstick, comprises drumstick skin roll-up means for rolling up the skin of the drumstick until it is above the position where the separating means are operational for separating the leg into a drumstick and a thigh portion.

The drumstick skin roll-up means comprise, for example, a pair of rotary pinions disposed at an angle to the path of the drumstick, and on either side thereof.

The claims and advantages will be more readily appreciated as the same becomes better understood by reference to the following detailed description and considered in connection with the accompanying drawings in which like reference symbols designate like parts.

BRIEF DESCRIPTION OF THE DRAWINGS

FIG. 3b shows a side view of the leg positioning means according to FIG. 3a.

DESCRIPTION OF THE PREFERRED EMBODIMENT

Figure 1:
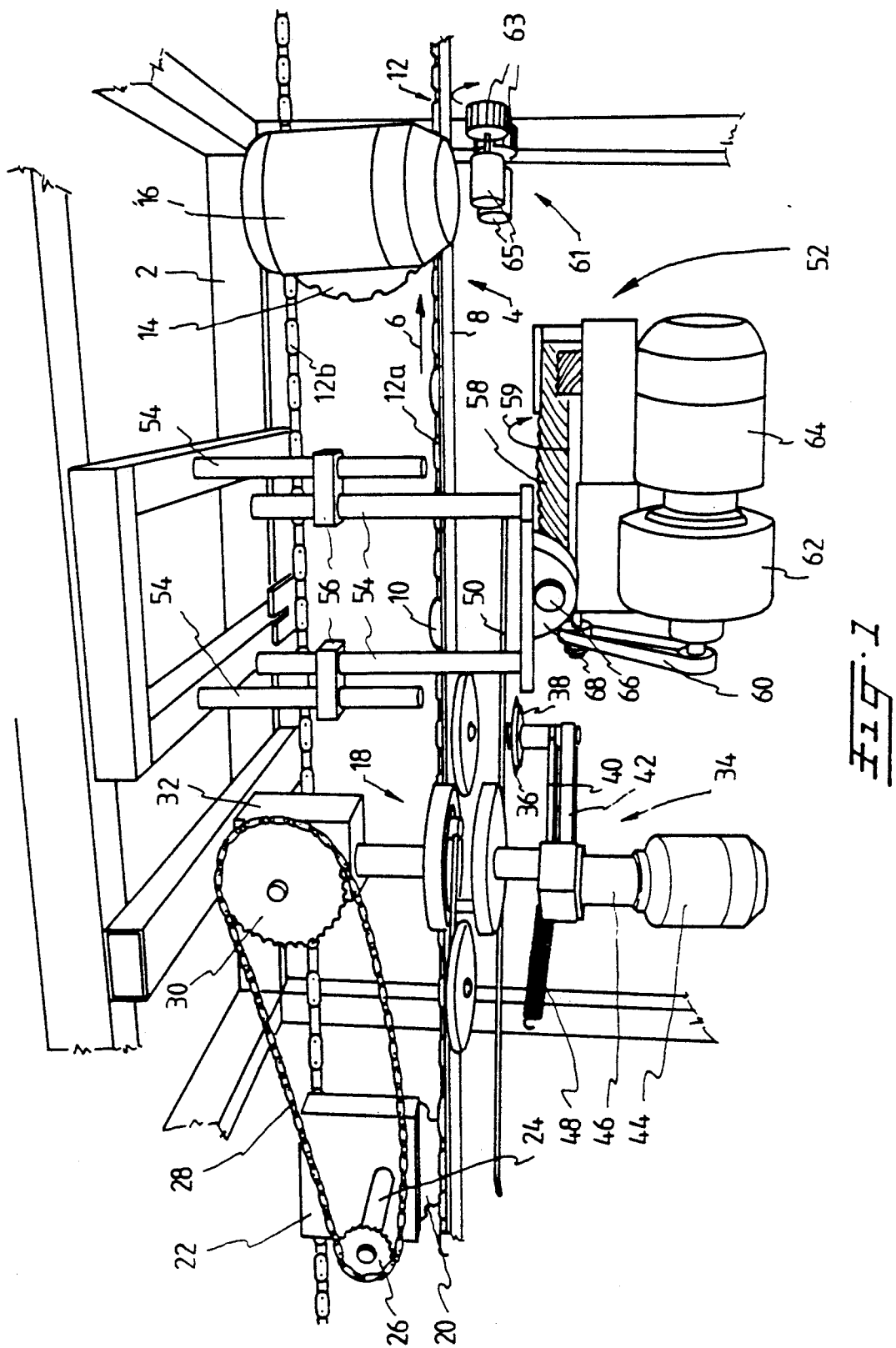
FIG. 1 shows a side view in perspective of one side of the device, disposed along a conveyor.

FIG. 1 shows a frame 2, disposed along a conveyor 4 in which legs of slaughtered birds can be moved from one processing station to the next in a direction of conveyance which is indicated by arrow 6. A device upstream of the device shown in FIG. 1 can be a dividing machine (not shown) for separating legs from the body of a bird, while a device (not shown here) placed downstream relative to the device shown in FIG. 1 can be a dividing machine which is known per se for separating the thigh portion from a leg. The conveyor 4 comprises guide rails 8, along which regularly spaced conveyor elements 10 can be moved by means of an endless chain 12 coupled thereto. The part of the chain 12 moving in the conveyance direction 6 is indicated here by 12a, while the return part of the chain 12 moving in the opposite direction is indicated by 12b. The chain 12 is driven at certain points through a toothed wheel 14 by a motor 16.

Leg positioning means 18, which are not shown in any further detail, are fixed on the frame 2, which means can be moved essentially in synchronism with the chain 12 by means of a mechanical coupling which has a gear wheel 20 meshing in the chain 12, in addition to a transmission 22 with a driven shaft 24, at the end of which a gear wheel 26 which drives a following gear wheel 30 by means of a chain 28 is fixed. A right-angle transmission 32 driven by the gear wheel 30, finally, sets the leg positioning means 18, disposed next to the path of the conveyor 4, in rotation. The position and design of the leg positioning means, and the way in which they work, will be explained below with reference to FIGS. 3a and 3b.

FIG. 1 also shows cutting means 34, comprising a rotary circular cutter 36, provided at the bottom side with a stop disc 38, whose edge radius is smaller than the cutting edge radius of the cutter 36, in such a way that the difference between the two radii is slightly smaller than or equal to the thickness of the skin part to be cut through on a leg of a bird. The cutter 36 and the stop disc 38 are supported on one end of a bar 40 and are coupled by means of a belt 42 to a motor drive 44. The cutting means 34 are pivotable about a shaft 46, while the cutter 36 can be driven, by means of a tension spring 48 fixed at one end to the frame 2 and at the other end to the arm 40, towards below the conveyor 4, until a stop (not shown) prevents further pivoting of the cutting means 34.

Fitted next to and below the path of the conveyor 4 are guide bars 50 for guiding and supporting one side of a leg being moved along in the conveyor, as will be explained below with reference to FIGS. 3a and 3b.

A thigh skin stripping device 52 is provided below the path of the conveyor 4, viewed in the direction of conveyance thereof, downstream relative to the cutting means 34. This device, which is connected to the frame 2 so that it is adjustable in height by means of bars 54 and clamping blocks 56, and can thus be adapted to the dimensions of the legs to be processed, comprises two parallel helical rollers 58 (of which only one can be seen in FIG. 1) which mesh and can rotate in opposite directions with respect to each other, indicated by arrow 59, in such a way that the skin of a leg dragging over the rollers is pulled into the nip, and is thus stripped off the leg. The rollers are driven by means of a belt 60 and a transmission 62 by a motor 64. Although the skin stripping device is shown in a horizontal position in FIG. 1, this device can, if desired, be disposed slanted relative to the conveyor 4 by means of a connection 68 which can be fixed or pivotable about a shaft 66.

Viewed in the downstream direction relative to the thigh skin stripping device 52, provision is made on both sides of the path of the drumstick on the conveyor 4, for drumstick skin roll-up means 61 fixed to the frame 2, in a manner not shown in detail. The drumstick skin roll-up means comprise two pinions 63 to be driven in opposite directions with respect to each other by means of motors 65. The directions of rotation of the respective pinions are selected in such a way that the sides of the pinions facing each other both move upwards.

The way in which the device works is explained in greater detail with reference to FIGS. 2, 3a, 3b, 4, 5 and 6a–6c.

Figure 2:
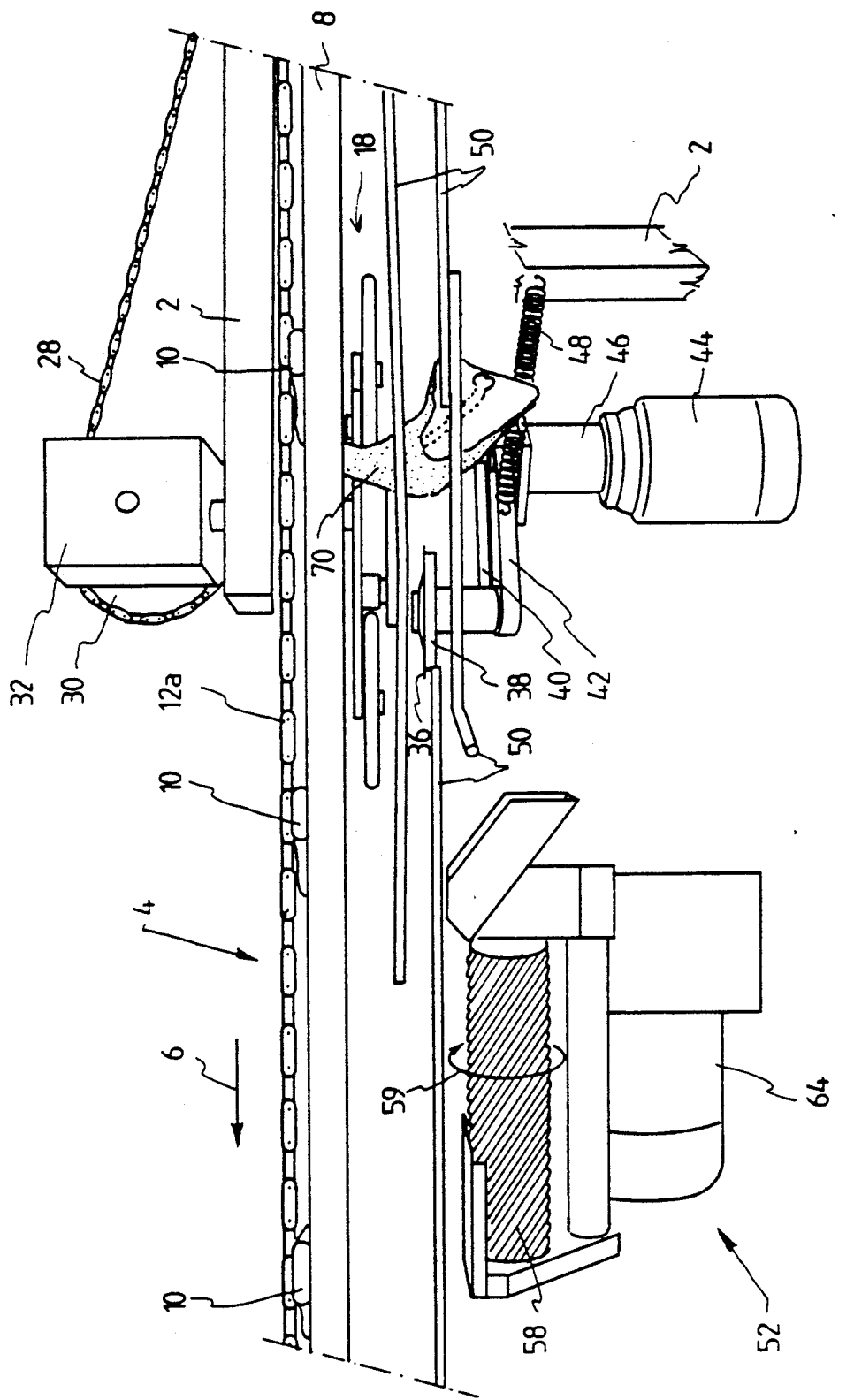
FIG. 2 shows a side view in perspective of the other side of the device, in which a leg of a bird is being processed.

As FIG. 2 shows, a leg 70 of a bird is conveyed by the conveyor 4 in the direction of arrow 6. The leg 70 is moved along both by a conveyor element 10 and by the leg positioning means 18 interacting therewith. The leg shown is a left leg, which is necessary for the proper functioning of the device shown. It will, however, be clear that such a device for the processing of right legs can be obtained simply by placing the leg positioning means 18, the guide means 50 and the cutting devices 34 at the other side of the conveyor 4 in a mirror image arrangement relative to the longitudinal plane of the device. On the same principle, a double design of device for processing both left and right legs can be obtained.

Figure 3A:
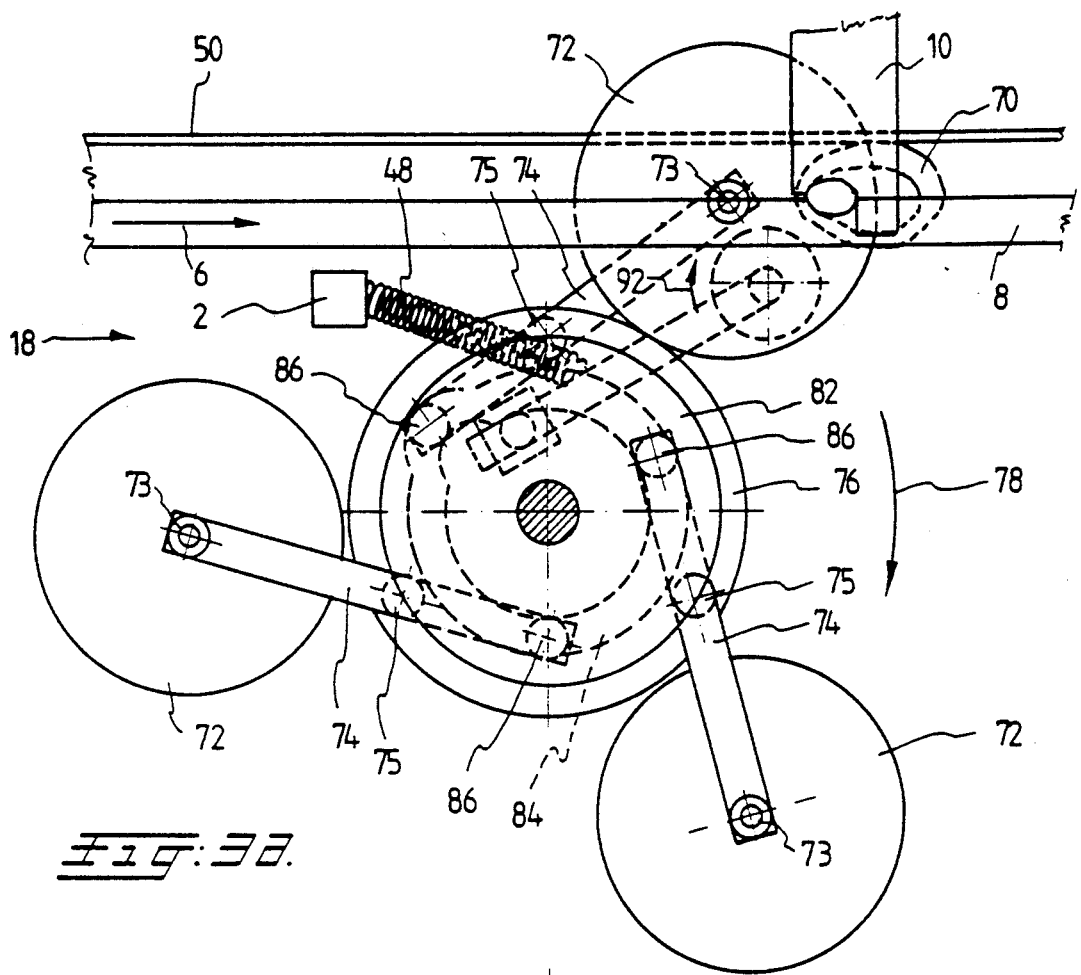
FIG. 3a shows a top view of the leg positioning means of FIG. 1.
Figure 3B:
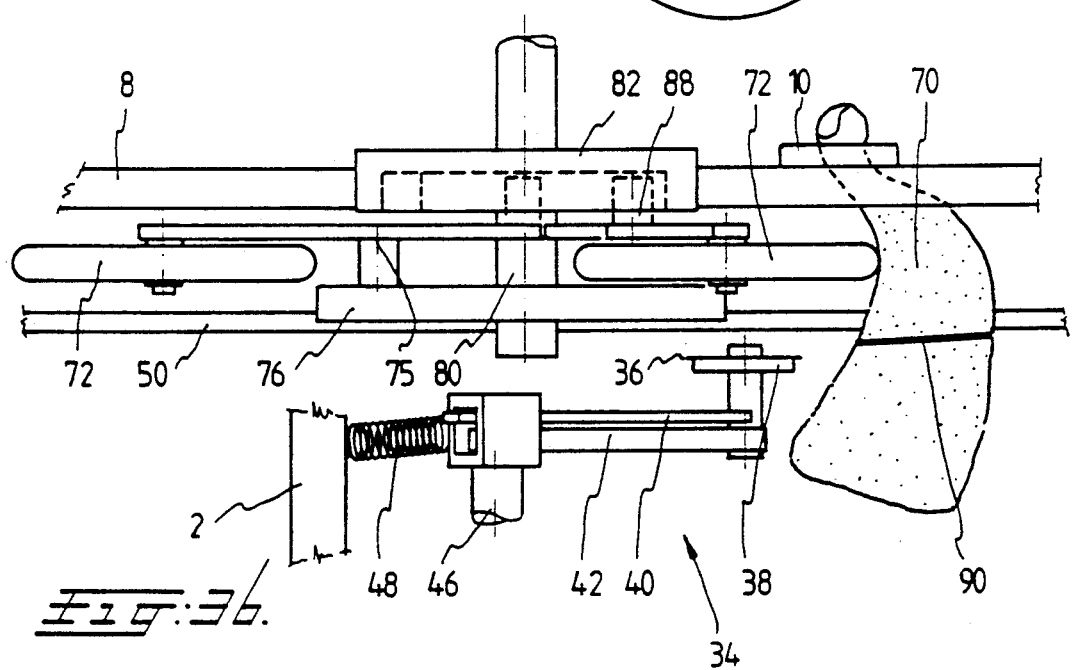

FIGS. 3a and 3b show in detail the design of the leg positioning means 18. For the sake of clarity, irrelevant details are omitted as far as possible in these figures. The leg positioning means comprise three discs 72 with a rounded-off edge, which discs are each supported so that they rotate freely at a point 73 on one end of an arm 74. The arms 74 are in turn pivotably supported at a point 75 on a disc 76 which can be driven, so that it rotates in the direction of arrow 78, by means of a shaft 80, coupled to the right-angle transmission 32 shown in FIG. 1. A disc 82 is fixed immovably above the disc 76. The disc 82 is provided at its underside with an endless groove 84, which acts as a curved track for controlling the movement of the arms 74 on which, for this purpose, a follower roller 88 is fixed partially in the curved track 84 at a point 86. In the case shown, the curved track 84 over the greater part of the periphery runs at a fixed distance from the shaft 80, and in a particular angular position has a small part which is set at a greater distance from the shaft 80. This part of the curved track 84 makes the disc 72 situated behind the leg 70, viewed in the conveyance direction 6, tilt slightly relative to the conveyor element 10. It will be clear that the degree of tilting can be set by selecting a suitable shape of the curved track 84, as a result of which the path 90 of the cutter 36 along the track can also be determined.

The cutter 36, which rotates in the direction of arrow 92 during operation of the device, exerts a force on the leg 70 at right angles to the conveyance direction 6 through the action of the spring 48 when the cut 90 is being made. This force is absorbed by the guide 50.

It will be clear that a cut can be made in a similar way on the opposite side of the leg by means of a combination of a cutter and a drive which is disposed in a mirror image relative to the vertical longitudinal plane of the device.

It will also be clear that, building further on principles of the invention described above, the kneecap of the leg can be turned either in the conveyance direction 6 (as shown in FIGS. 2, 3a and 3b) or in the opposite direction. In other words, the axis extending from the front side to the backside of the leg is parallel to the predetermined path in the conveyor. The tilt of the leg required for making the skin cut can be obtained in the latter case by making the leg positioning means hold back the leg slightly at the rear side thereof relative to the movement of the conveyor elements. Of course, this requires a modified mutual arrangement of the cutting means and the leg positioning means along the conveyor.

Figure 4:
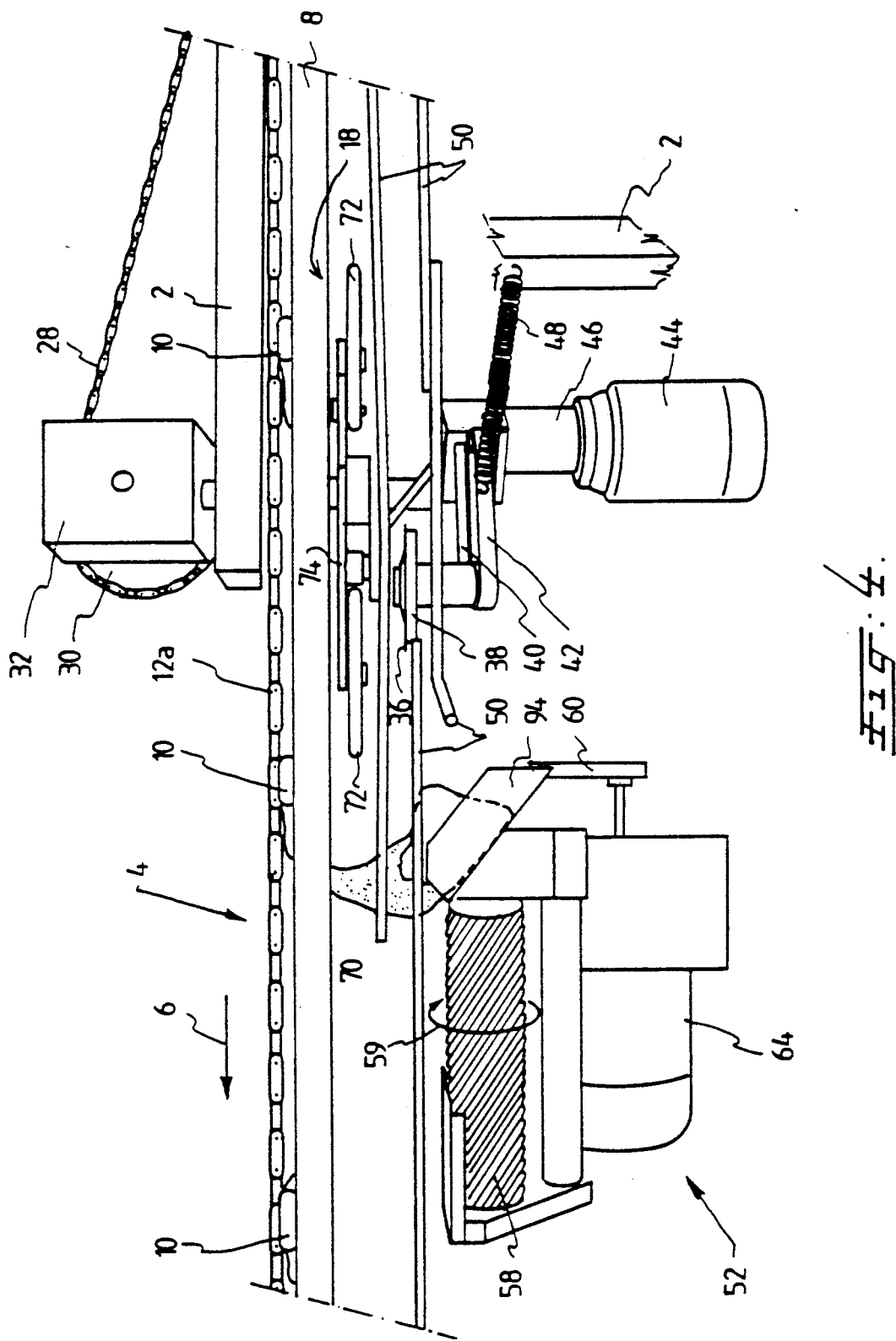
FIG. 4 shows the view according to FIG. 2 in a subsequent stage of the processing of the leg of the bird.

FIG. 4 shows the stage of the processing in which the leg 70 provided with a cut 90 is conveyed by means of a feed trough 94 to the two helical rollers 58. The feed trough 94 ensures that the leg 70 arrives centered above the helical rollers 58.

Figure 5:
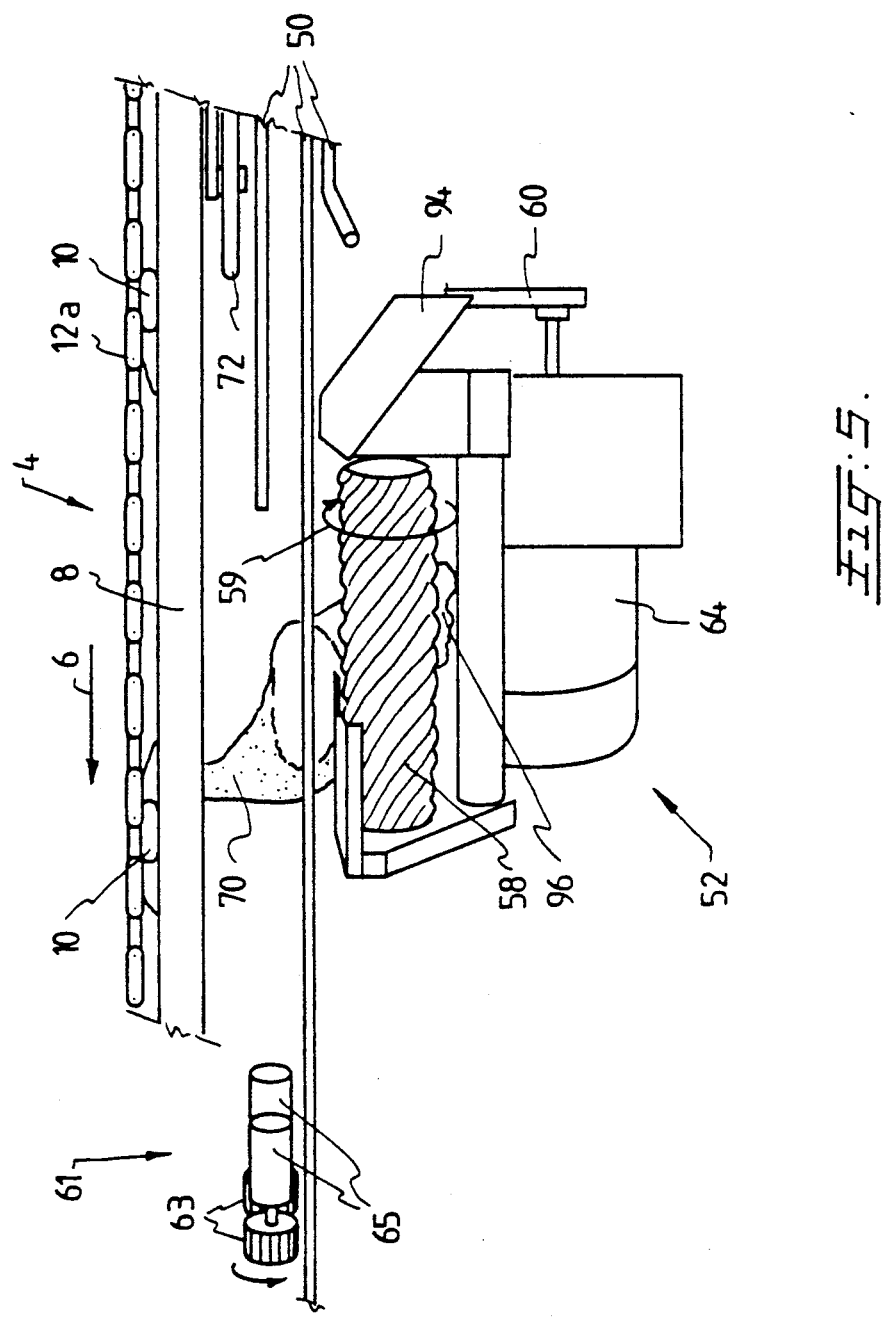
FIG. 5 shows the view according to FIG. 2 in a stage of the processing following the stage shown in FIG. 4.

FIG. 5 illustrates the mode of operation of the thigh skin stripping device 52, in which the thigh skin 96 is pulled into the nip of the helical rollers 58 through the rotation of the rollers in the direction of the arrow 59.

Figure 6C:
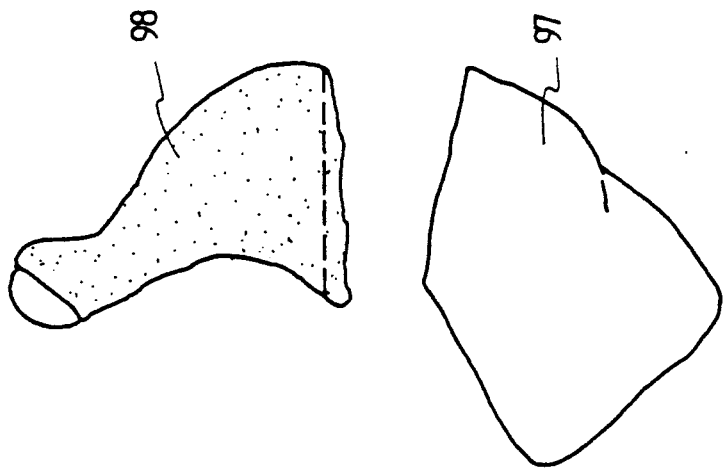
FIG. 6c shows the processing result after passing of the separating means for dividing the leg into a drumstick and a thigh portion.
Figure 6B:
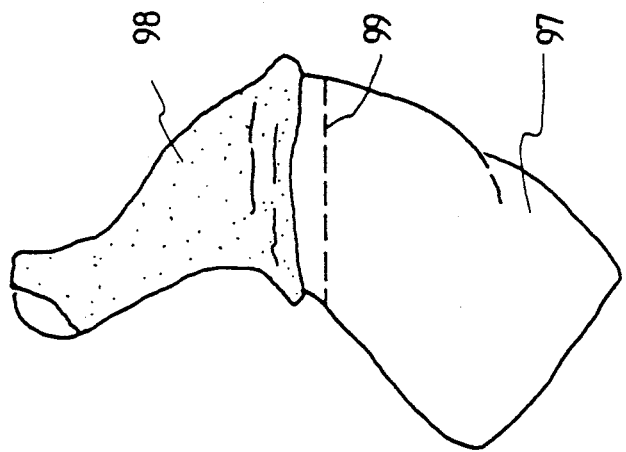
FIG. 6b shows the processing result after passing of the drumstick skin roll-up means.
Figure 6A:
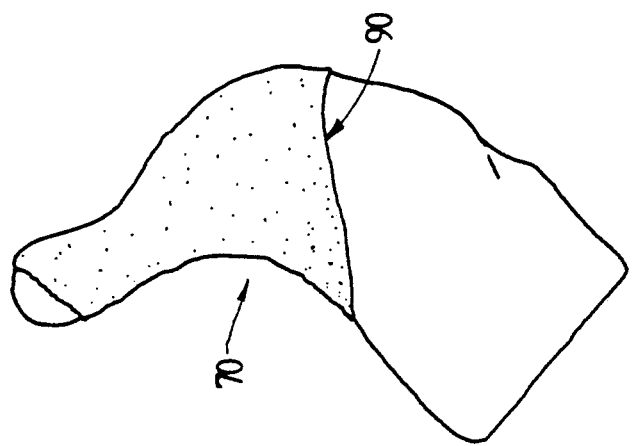
FIG. 6a shows the processing result obtained with the device in the stages shown before it.

The result of the operation carried out by the thigh skin stripping device is shown in FIG. 6a, in which it can be seen clearly at the outside of the (left) leg 70 shown how neatly and clearly defined the removal of the thigh skin can be with the device according to the invention.

FIG. 6b then shows a side view of the leg 70 after it has passed the drumstick skin roll-up means 61. The drumstick skin is rolled up so far that when the thigh portion 97 is separated from the drumstick 98 along the line 99, for example by conveying the leg 70 past cutting means, this skin is not touched and after the separation falls over the cut position, as FIG. 6c illustrates.

While the invention has been described and illustrated in its preferred embodiment, it should be understood that departures may be made therefrom within the scope of the invention, which is not limited to the details disclosed herein.

What is claimed is:

1. A method for processing the skin of a leg of a slaughtered bird, said bird or said leg being conveyed along a predetermined path in a conveyor, wherein the skin of the leg is cut at least almost completely in the vicinity of the knee joint along a side of the leg between the region of the kneecap and the region of the back of the knee, the tissue lying under the skin remaining essentially intact, by conveying the leg in a position determined by leg positioning means interacting with the conveyor past cutting means and placing it in contact therewith, the cutting depth of the cutting means being limited by a stop resting on the skin near the skin cut and being connected to the cutting means.

2. A method according to claim 1, wherein the skin of the leg is cut through completely or almost completely both at the inside and at the outside thereof.

3. A method according to claim 1, wherein the leg is hanging by the tarsal joint in the conveyor, an axis extending from the front side to the backside of the leg being parallel to the predetermined path in the conveyor, and the leg positioning means hold the leg tilted in the direction of its front side while passing the cutting means.

4. A method according to claim 1, wherein the leg is hanging by the tarsal joint in the conveyor, an axis extending from the front side to the backside of the leg being parallel to the predetermined path in the conveyor, and the at least partially cut away thigh skin is stripped downwards from the leg by thigh skin stripping means.

5. A method according to claim 1, wherein the
hanging by the tarsal joint in the conveyor, the front side of the leg being directed in the direction of conveyance or in the opposite direction, and the edge of the skin of the drumstick is rolled up above the cut made in the skin prior to the separation of the drumstick from the thigh portion, in order to carry out the separating operation above the position of the skin cut on the leg and below the edge of the rolled-up skin of the drumstick.

6. A device for processing the skin of a leg of a slaughtered bird, said bird or said leg being conveyable by a conveyor element of a conveyor along a predetermined path, the device comprising:
leg positioning means interacting with the conveyor, which leg positioning means can guide the leg and support it;
cutting means fitted in the area of the path of the leg for at least almost completely cutting through the skin of the leg in the vicinity of the knee joint along a side of the leg between the region of the kneecap and the region of the back of the knee; and
cutting depth limiting means for limiting the cutting depth of the cutting means with a stop resting on the skin near the skin cut and being connected to the cutting means.

7. A device according to claim 6, wherein two cutting means are fitted on either side of the path of the leg for cutting through the skin both on the inside and on the outside of the leg.

8. A device according to claim 6, wherein the cutting means comprise a cutter to be driven so that it rotates with an essentially circular cutting edge, which cutter is provided with a stop face near the cutting edge, for limiting the cutting depth, and is biassed in the direction of the leg.

9. A device according to claim 8, wherein the cutting edge of the cutter is formed by a number of adjustable cutters fitted along the periphery of a support, which cutters are adjustable in the radial direction and have a cutting edge running essentially in the peripheral direction.

10. A device according to claim 8, wherein the cutter can be driven in such a direction of rotation that the cutting edge thereof at the side facing the leg moves in the direction of conveyance of the leg.

11. A device according to claim 6, wherein the leg is hanging by the tarsal joint from the conveyor element, and the leg positioning means can exert a force on the leg in the direction of its front side, for taking the leg into a tilted position while it is passing the cutting means.

12. A device according to claim 6, wherein the leg is hanging by the tarsal joint from the conveyor element, and the leg positioning means comprise a number of positioning elements which are movable in a path which at least at the position of the working region of the cutting means coincides with that of the leg and has the same or the opposite direction.

13. A device according to claim 12, wherein the movement of the positioning elements can be controlled relative to the movement of the conveyor elements.

14. A device according to claim 13, wherein each positioning element is fitted on one end of an arm, which at the other end is provided with a follower wheel and between the two ends is pivotably mounted on a support which is driven so that it rotates about a shaft, the follower wheel being guided in a closed curved track running at right angles to the shaft, for controlling the path of the positioning element.

15. A device according to claim 12, wherein the positioning elements consist of freely rotatable, centrally supported discs.

16. A device according to claim 6, wherein the leg is hanging by the tarsal joint from the conveyor element, and thigh skin stripping means are provided for stripping the at least partially cut away thigh skin downwards.

17. A device according to claim 16, wherein the thigh skin stripping means comprise a pair of helical rollers disposed below the conveyor parallel to the direction of conveyance in the path of the thigh portion of the leg, which rollers can be driven so that they rotate in opposite directions with respect to each other.

18. A device according to claim 6, comprising:
separating means disposed along the path of the leg, for separating the leg hanging by the tarsal joint from the conveyor element into a drumstick and a thigh portion; and
drumstick skin roll-up means for rolling up the skin of the drumstick until it is above the position where the separating means operate, for separating the leg into a drumstick and a thigh portion.

19. A device according to claim 18, wherein the drumstick skin roll-up means comprise a pair of rotary pinions disposed at an angle relative to the path of the drumstick, on either side thereof.

20. A method according to claim 2, wherein the leg is hanging by the tarsal joint in the conveyor, an axis extending from the front side to the backside of the leg being parallel to the predetermined path in the conveyor, and the leg positioning means hold the leg tilted in the direction of its front side while passing the cutting means.

21. A method according to claim 2, wherein the leg is hanging by the tarsal joint in the conveyor, an axis extending from the front side to the backside of the leg being parallel to the predetermined path in the conveyor, and the at least partially cut away thigh skin is stripped downwards from the leg by thigh skin stripping means.

22. A method according to claim 2, wherein the leg is hanging by the tarsal joint in the conveyor, and axis extending from the front side to the backside of the leg being parallel to the predetermined path in the conveyor, and the edge of the skin of the drumstick is rolled up above the cut made in the skin prior to the separation of the drumstick from the thigh portion, in order to carry out the separating operation above the position of the skin cut on the leg and below the edge of the rolled-up skin of the drumstick.

* * * * *